United States Patent
Opel et al.

(10) Patent No.: US 6,496,628 B1
(45) Date of Patent: *Dec. 17, 2002

(54) OPTICAL CABLE

(75) Inventors: Ernst Opel, Lautertal; Ilona Schmidt, Rödental, both of (DE)

(73) Assignee: CCS Technology, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/509,634

(22) PCT Filed: Sep. 23, 1998

(86) PCT No.: PCT/DE98/02842
§ 371 (c)(1),
(2), (4) Date: Mar. 29, 2000

(87) PCT Pub. No.: WO99/17144
PCT Pub. Date: Apr. 8, 1999

(30) Foreign Application Priority Data

Sep. 29, 1997 (DE) .......................................... 197 42 941

(51) Int. Cl.[7] .................................................. G02B 6/44
(52) U.S. Cl. ........................ 385/110; 385/103; 385/114
(58) Field of Search ................................. 385/100–114

(56) References Cited

U.S. PATENT DOCUMENTS

| | | | |
|---|---|---|---|
| 4,770,489 A | 9/1988 | Saito et al. | 385/113 |
| 5,098,177 A | 3/1992 | Tanaka | 385/110 |
| 5,621,842 A | 4/1997 | Keller | 385/114 |
| 6,195,486 B1 * | 2/2001 | Field et al. | 385/100 |

FOREIGN PATENT DOCUMENTS

| | | |
|---|---|---|
| DE | 39 14 367 | 11/1990 |
| DE | 19647312 A1 | 5/1998 |
| EP | 0 703 480 | 3/1996 |

OTHER PUBLICATIONS

Abstract of Japanese Published Application 57–109906 of Jul. 8, 1982, *Patent Abstracts of Japan*, vol. 006, No. 203, (P–148), Oct. 14, 1982.

Abstracts of Japanese Published Application 60–257414 of Dec. 19, 1985, *Patent Abstracts of Japan*, vol. 010, No. 135, (P–457), May 20, 1986.

Mahlke et al, "Optical Cable Design", *Fiber Optic Cables*, John Wiley & Sons, 3rd Ed. 1997, pp. 115–158.

Dietrich Marcuse, *Curvature Loss Formula For Optical Fibers*, J. Opt. Soc. Am., Mar. 1976, pp. 216–220, vol. 66, No. 3.

Von Günther Mahlke and Peter Gössing, *Lichtwellenleiterkabel*, 4. Auflage, 1995, cover, index and pp. 111–147, Germany.

Güther Mahlke and Peter Gössing, *Fiber Optic Cables*, 3rd, revised and enlarged edition, 1997, cover and pp. 115–159.

* cited by examiner

*Primary Examiner*—Phan T. H. Palmer

(57) ABSTRACT

The fiber-optic cable comprises at least one element for high tensile stresses, a cable cladding, and at least one optical transmission element (optical fiber), which is accommodated in a chamber. The thermal contraction of the cable (dL/L) is selected such that it does not differ by more than 30% from the thermal contraction (dL/L) of the optical transmission element used in the range from 20° C. to the lower temperature limit value of the cable.

17 Claims, 5 Drawing Sheets

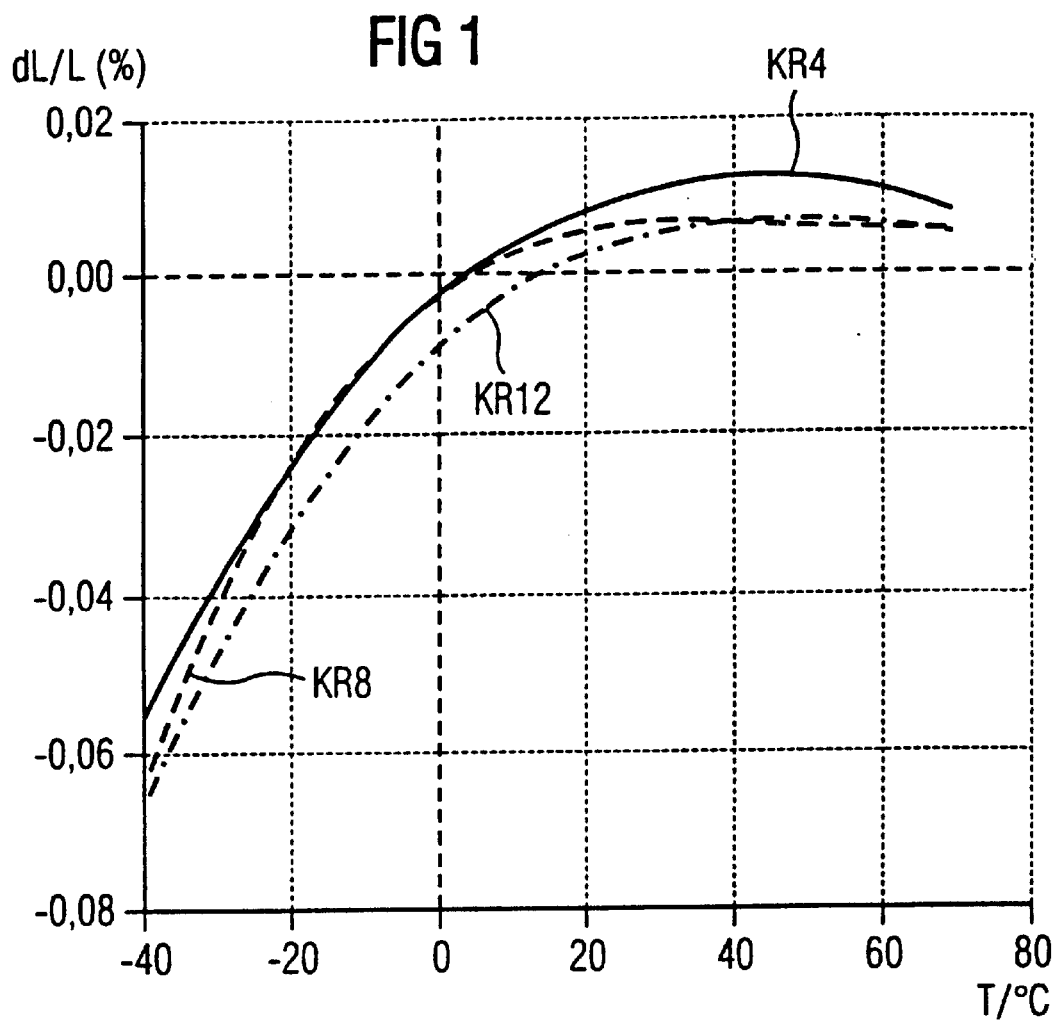
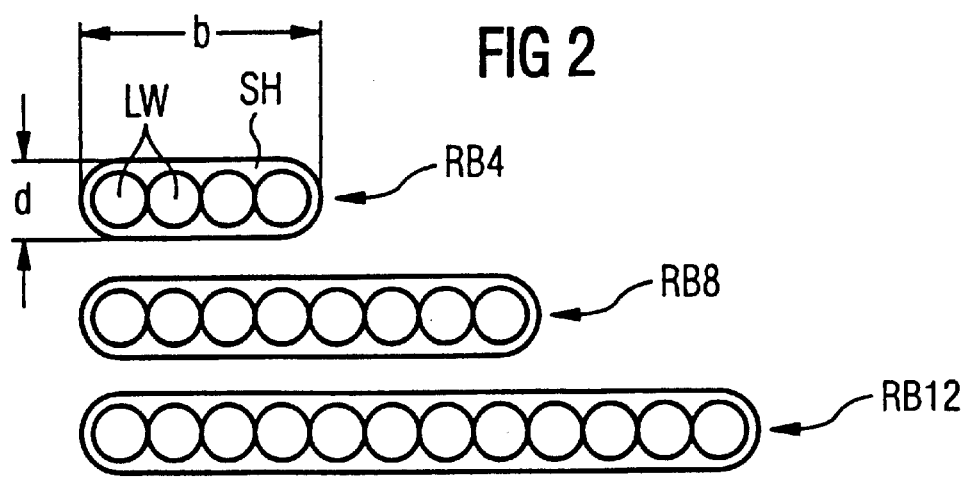

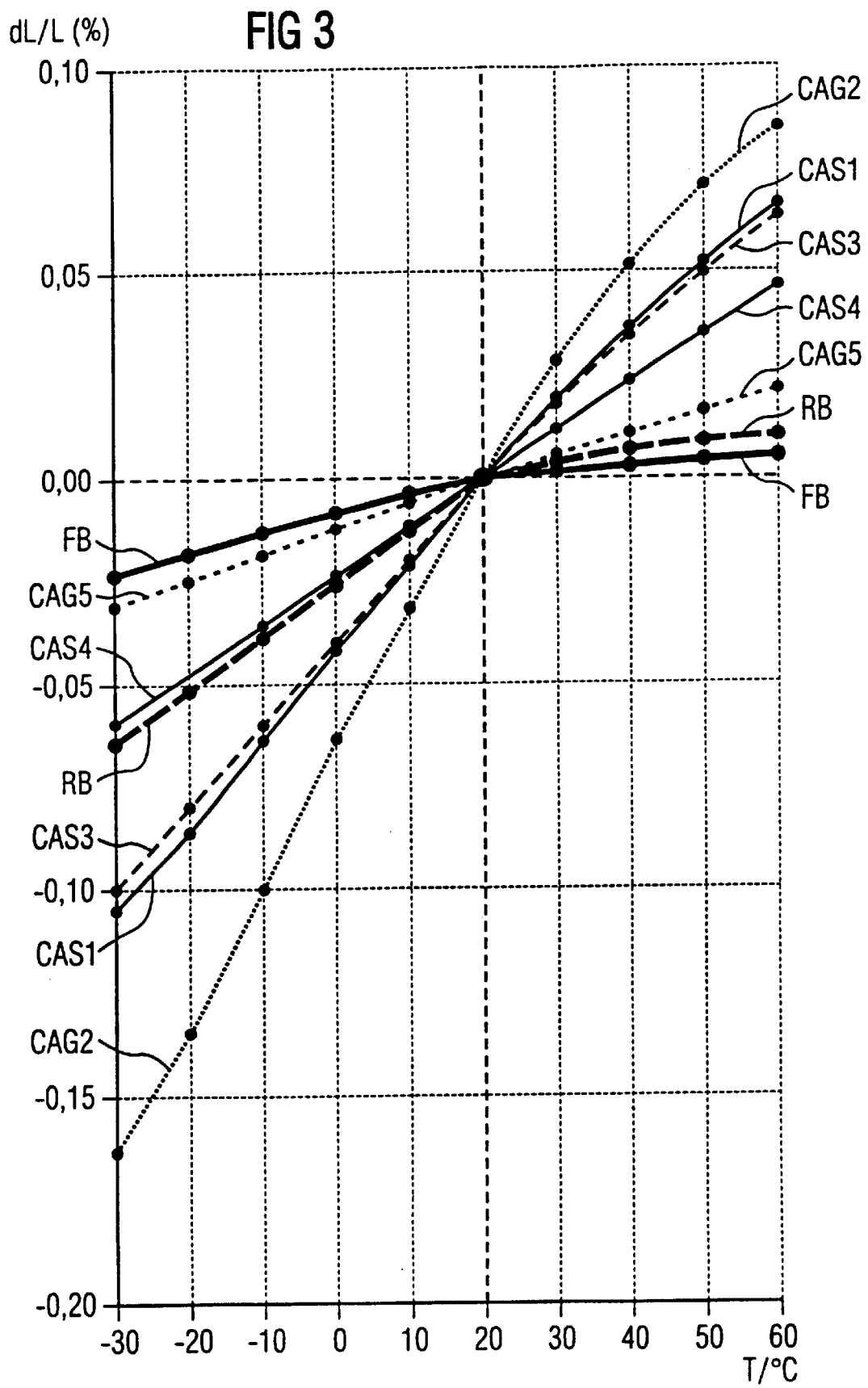

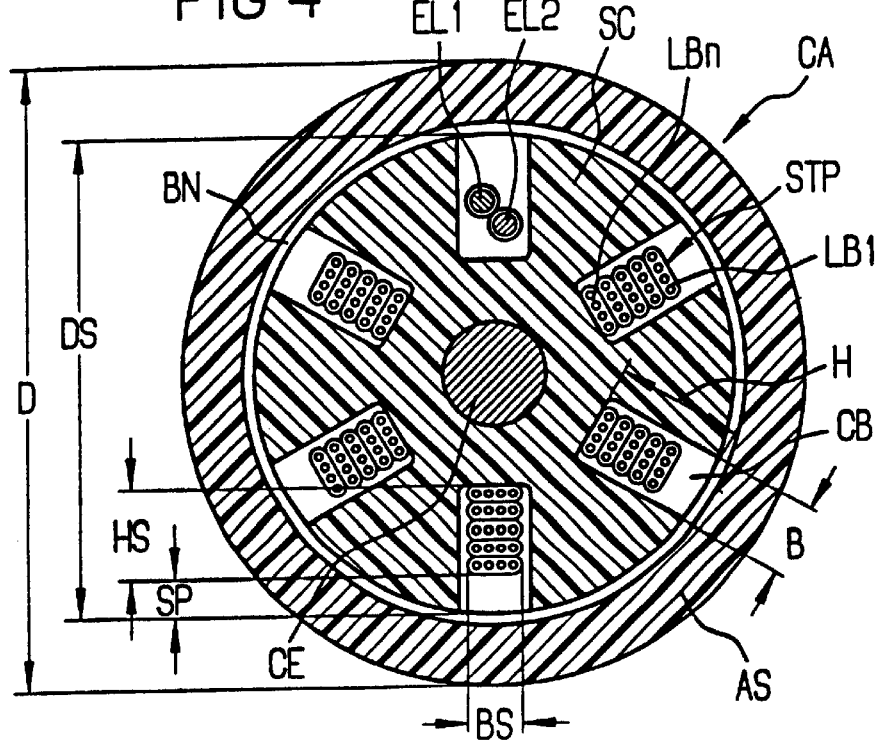
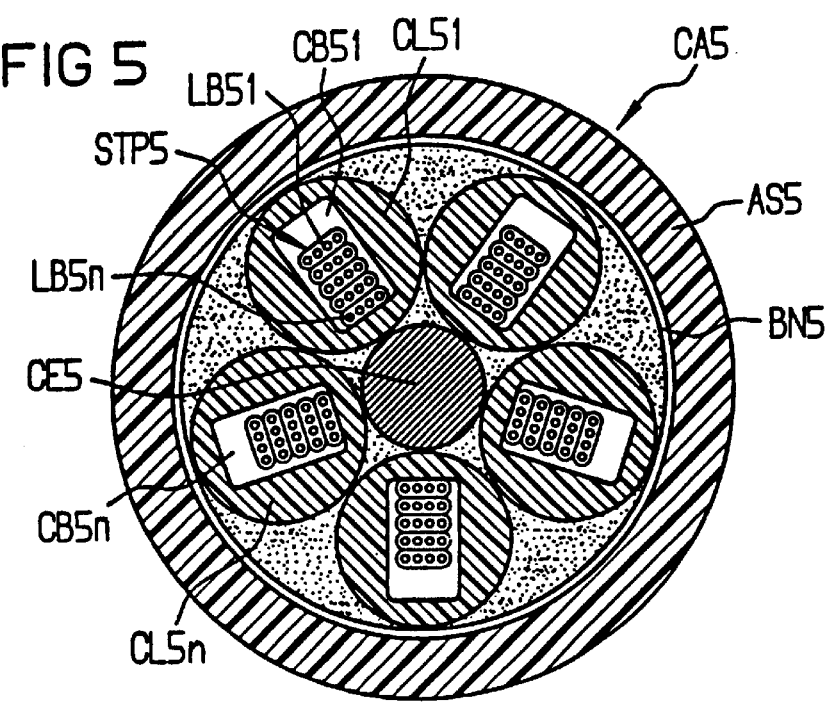

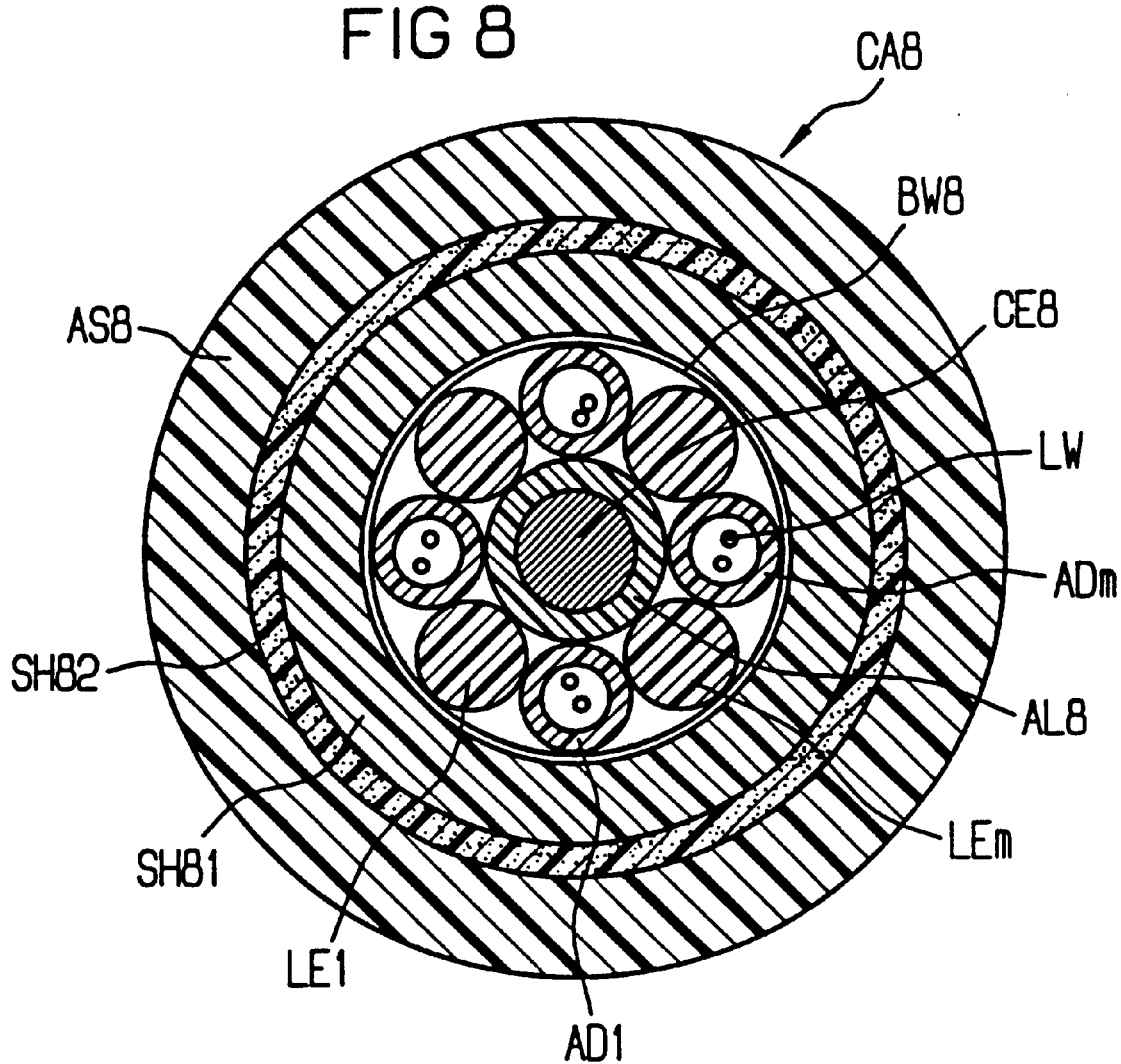

OPTICAL CABLE

BACKGROUND OF THE INVENTION

The invention relates to a fiber-optic cable having at least one element for high tensile stress, at least one cable cladding, and at least one element with a chamber receiving at least one optical transmission element having outer dimensions slightly smaller than the dimensions of the chamber.

It is known that optical fiber elements have different thermal coefficients of expansion than the other elements of the cable, particularly the cable sheath, cladding materials of the leads, possible resistance elements against tension or crushing, and so on. When the optical fibers are accommodated loosely in a chamber, then they are coupled to the actual cable solely by friction, and as a consequence of the different thermal coefficients of expansion of the actual cable compared to the optical fiber element, macrobends can arise, which result in an increase in attenuation for the optical fiber element. It is therefore common to give the chamber that accepts the optical fiber elements such ample dimensions that elevations of attenuation due to macrobends are avoided. This very broad method has the disadvantage that the cable cross-section is significantly increased, because the cables known hitherto have always involved some type of "overdimensioning". Additional details of the cable structure, dimensioning and calculation can be found in chapter 9 entitled "Optical Cable Design", Fiber Optic Cables, G. Mahlke and P. Gössing; John Wiley & Sons Ltd., $3^{rd}$ ed., 1997, pp. 115–158.

U.S. Pat. No. 4,770,489 teaches the loose accommodating of optical fibers in corresponding chambers or tubes. A plurality of tension-resistant elements are additionally provided, which comprise a higher E module than the actual cable and at the same time, a lower thermal coefficient of expansion. For example, fibers that consist of aramide yarn, carbon, or glass embedded in an epoxy resin can be used for these elements. In this way, the operative range of a cable can reach from −20 degrees Celsius to +70 degrees Celsius, instead of from −20 degrees to +60 degrees. This is assuming that the cable structure as such is left unaltered.

U.S. Pat. No. 5,098,177 teaches an optical cable that comprises an element for high tensile stresses. The optical fibers are accommodated loosely in chambers or tubes and comprise a coating of LCP (Liquid Crystal Polymer) whose linear temperature coefficient of expansion is between $-15 \cdot 10^{-6}$ and $5 \cdot 10^{-6} (1/K)$. In consideration of the different expansions, a relatively large tolerance range (play) of 0.5% to the wall is provided. This and the coating processes represent an additional outlay, and besides, the outer diameter of the optical fibers is increased by the added coating, so that a part of what is achieved by limiting the expansion behavior is lost again due to the increased space requirement of the optical fiber.

SUMMARY OF THE INVENTION

It is the object of the invention to demonstrate how it is possible to reduce, in a simple manner, the space requirement of the chamber within the optical cable that accepts the optical transmission element(s). This object is achieved by a cable having at least one element for high tensile stress, at least one cable cladding and at least one element with a chamber receiving at least one optical transmission element having an outer dimension slightly smaller than the dimension of the chamber and the cable has a thermal contraction (dL/L) in a range from 20° C. to a lower temperature, for example −30° C., which does not differ more than 30% from the thermal contraction of the optical transmission element.

The invention is based on tuning (synchronizing) the expansion behavior of the cable on one hand and of the optical transmission element on the other hand (in the form of an individual optical fiber, a band of optical fibers or some other elongated optical fiber structure forming a mechanical unit) to one another in the lower temperature range—which is particularly critical for macrobends—in such a manner that these deviate from each other only by a predetermined value at the most. In this way, it is possible to create an optimally adjusted "movement window" for the optical transmission element, this window being optimally small in and of itself, but nevertheless still sufficient to accept macrobends which result from different residual, in particular local, linear expansions (e.g. as a result of bending) and thereby to prevent elevations of attenuation.

In addition to the above solution or independent of it, the fiber-optic cable can also be inventively constructed such that, below 20° C., particularly at the lower temperature limit value of the cable (e.g. −30° C.,), the disparity between the percentage expansion value of the optical transmission element, on one hand, and the percentage expansion value of an appertaining cable structure, on the other hand, is selected such that the difference of the expansion values is less than ±0.03 percentage points, preferably less than ±0.02 percentage points, and particularly less than ±0.01 percentage points.

The dimensions of the chamber are appropriately so constructed that local bending radii that may result from an additional excess length of the optical transmission element at the lowermost temperature limit value are greater than 70 mm.

In addition to the above solution or independent of it, another course of action consists in thickening the optical transmission element using plastic additives that are connected to it in a mechanically secure manner (for instance, using an additional coating on the optical fiber and/or some other type of material deposition, for instance on the outside on optical fiber bands), such that at low temperatures a preferably slight (e.g. max. 0.05%) adjustment of the expansion to the expansion of the cable structure is achieved.

The invention and its developments are detailed below with the aid of drawings, which represent exemplifying embodiments.

BRIEF DESCRIPTION OF THE DRAWINGS

FIG. 1 is a graph illustrating the relative expansion of different optical fiber bands as a function of temperature, FIG. 2 are end views of the optical fibre bands whose temperature response are illustrated in FIG. 1, FIG. 3 is a graph illustrating the temperature response of different cable structures and of optical fibers, or respectively, optical fiber bands, FIG. 4 is a cross-section of an optical cable with optical fiber bands accommodated in chambers, FIG. 5 is a cross-section of a cable with strand elements, which contain optical fiber bands and which have been stranded on a central element, FIG. 8 is a cross-section of a cable having strand elements that have been stranded on a central element, which contain individual optical fibers.

DESCRIPTION OF THE PREFERRED EMBODIMENTS

Figure 6:
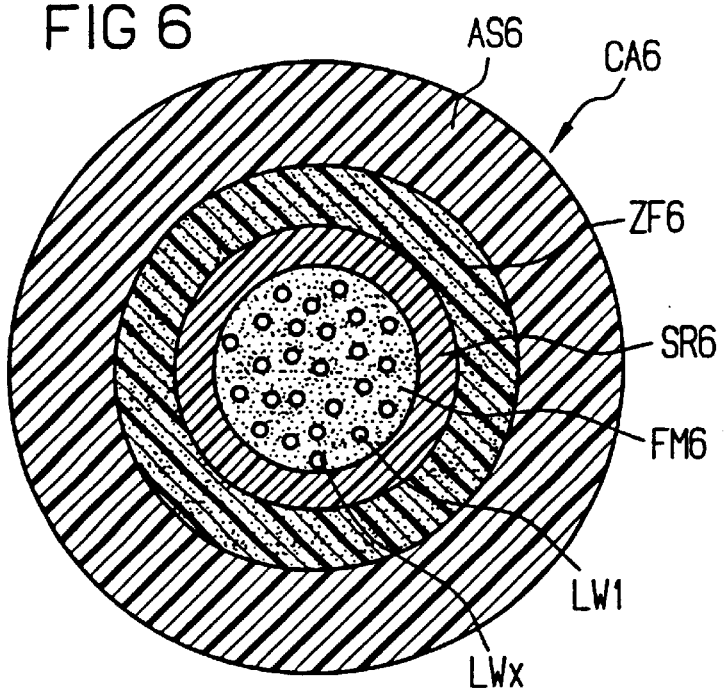
FIG. 6 is a cross section of a cable having individual optical fibers that are arranged in a central tube.

FIG. 1 represents the characteristic of the expansion dL/L (%) as a function of the temperature T in °C. Specifically, three different optical fiber bands were examined in detail, which are represented in FIG. 2 in a frontal or end view and are referenced RB4, RB8, and RB12. In the band RB4, a total of four optical fibers LW are provided; in RB8, a total of eight; and in RB12, a total of twelve optical fibers. The optical fibers exhibit the typical structure; that is, they have a core with an approximately 9-$\mu$m diameter (given monomode fibers), a cladding with an outer diameter of 125 $\mu$m, and a single-layer or multi-layer coating of plastic (e.g. acryl resin, urethane acrylate, or silicium acrylate, epoxy acrylate, unpolar systems, and so on) with an outer diameter of approx. 250 $\mu$m. Alternatively, multi-mode fibers (core-diameter=50 $\mu$m/62.5 $\mu$m or 100 $\mu$m) or POF fibers (Plastic Optical Fibers) can be used. It is preferable when these optical fibers expediently abut one another directly with their coatings and are surrounded by a common protective sheath SH on the outside, which advantageously consists of a plastic material such as a thermoplast or an acrylate, particularly urethane acrylate. The thickness d of the optical fiber band so produced amounts to approximately 280–400 $\mu$m, preferably between 310 and 370 $\mu$m, for all embodiment forms of the optical fiber bands represented in FIG. 2. For the measurement which will now be described, the band RB4 had a width b of 1.1 mm; the band RB8, 2.1 mm; and the band RB12, approximately 3.2 mmn. The thickness or height d of the band RB4 equaled 370 $\mu$m; that of the band RB8, 310 $\mu$m; and that of the band RB12, likewise 310 $\mu$m.

As emerges from FIG. 1, the shape of the curve of the temperature response for the expansion dL/L is quite similar for all three bands of the type represented in FIG. 2, wherein the curve KR4 represents the dL/L value for the band RB4; the broken-curve KR8 represents that for the band RB8; and the broken chain-line curve KR12 represents that for the band RB12. In particular, it can be seen that above 20° C., the curves run almost horizontally; that is, the temperature coefficient of expansion is essentially determined by the glass fraction of the optical fibers. This can be explained by the fact that at the higher temperatures, the influence of the protective sheath SH and/or of the coating of the optical fibers LW is no longer as strong as it is at lower temperatures, owing to the greater softness of the materials. Below 20° C. and particularly below 0° C. the temperature response for the expansion dL/L is very strong, which indicates a strong interaction here between the band coating and fiber coating, on one hand, and the glass of the actual optical fibers, on the other hand. Glass which is used for optical fibers has a coefficient of expansion of $\alpha=0.04\cdot10^{-5}$ to $0.1\cdot10^{-5}$ 1/K, while the materials used for the coating have coefficients of expansion in the range $\alpha=5\cdot10^{-5}$ to $30\cdot10^{-5}$ 1/K, and those used for the protective sheath, in the range of $\alpha=5\cdot10^{-5}$ to $30\cdot10^{-5}$ 1/K, whereby the first value applies to $-30°$ C., and the last value applies to 60° C. Furthermore, the temperature characteristic of the coefficient of expansion of these plastic materials is not linear.

FIG. 3 also exemplarily represents the temperature response for various cable structures for the temperature range T between $-30°$ (taken as lower temperature limit of the cable) and $+60°$ C. (taken as upper temperature limit of the cable). Normalized at 20° C. (room temperature), the curves exhibit linear deviation dL/L=f(T), whereby the relation $\Delta L/L=\epsilon=\alpha\Delta T$ approximately applies incrementally, with $\alpha$ as the temperature coefficient of expansion and with temperature steps of $\Delta T=10°$ C. in the present example. The average respective (incremental) temperature coefficient of expansion $\alpha$ thus corresponds to the slope of the expansion curve between two such incremental temperature points, so that $\alpha=\epsilon/\Delta T$.

The cable structures presume grooved cables having optical fiber bands, as the cross-section represented in FIG. 4 of such a cable CA shows. But any other cable structure can be used in the context of the invention; for instance, loose tube cable, aerial cable, and so on, which will be explained below with the aid of FIGS. 6 to 8.

The cable CA according to FIG. 4 has a central tension element CE, which is made of steel wires or of plastic material that is reinforced with glass fiber (GFK or FRP= "Fiber Reinforced Plastic"), followed by an intermediate layer (chamber body) SC that is fixed thereto, which is made of plastic material and is provided with preferably rectangular grooves or chambers CB that are open to the outside and that run in the shape of a helix. The open chambers CB are sealed by a braiding or wrapping BN, for instance using a film, an expanding fleece or the like. This is followed in the outward direction by an outer cladding AS, which is preferably made of plastic, particularly PE. In each of the chambers CB, a stack STP of optical fiber bands is respectively arranged, these being stacked on top of one another in the radial direction and referenced LB to LBn in one of the chambers (in this example n=5 and the number of optical fibers in each band is assumed to be 4). These optical fiber bands LB to LBn can preferably have the structure that is detailed in FIG. 2.

The optical fiber bands CB to LBn are arranged in the chambers CB such that they can be moved; that is, the cross section of the chambers LB (width B, height H) is somewhat larger than the outer dimensions (width BS, height HS) of the stack STP of the bands LB to LBn. In this way, these optical fiber bands are indeed coupled by friction to the wall, or respectively, the floor of the chamber in particular subregions, but otherwise they are basically freely movable. The width B (preferably between 0.2 and 0.4 mm—the width is dependent on the bending radius of the cable, and the given values apply when the bending radius=10 times the cable diameter) is expediently only slightly greater than BS, because then no notable temperature problems occur.

Every such cable has a specific temperature response of the temperature coefficient of expansion $\alpha$, this value $\alpha$ being strongly dependent on the dimensions and the materials used, or respectively, on the material fractions in the overall construction. A particularly strong influence on the expansion behavior is exerted by materials that are highly resistant to tensile stress, such as the core CE, which is highly resistant to tensile stress, and by plastic materials of larger dimension, such the plastic material, which surrounds the chambers CB, of the chamber body SC and the material of the single-layer or multi-layer outer cladding AS.

The greater the differences between the coefficients of expansion of the cable structure of the cable CA according to FIG. 4, on one hand, and of the optical fiber bands LB to LBn, on the other hand, the larger the respective chamber CB must be dimensioned in the radial direction (=chamber height H), so that, for the predetermined operating temperature range (usually from $-30°$ C. to $+60°$ C.), the movement possibilities (deviation possibilities) are provided for the stack STP of optical fiber bands LB to LBn are sufficient in order to be able to compensate the differences in the coefficients of expansion without giving rise to undesirably large macrobends. Although subsequent remarks are based on a grooved cable, the principle of the invention—that is, the idea of fitting ("synchronizing") the temperature response—can be applied to any other cable structure.

Take, for example, a grooved cable according to FIG. 4 with a maximum fiber count of 100. From the total of six chambers, one can be equipped with an insulated electrical conductor pair EL1, EL2 (signal channel); it is also possible that all chambers are occupied by band stacks, or that a few remain empty, or respectively, only partially equipped. The cable shown can accept up to 100 optical fibers, since 20 optical fibers (5 bands of 4 optical fibers each) are provided in each of the remaining 5 chambers CB.

The statements made below in connection with FIG. 3 presume a diameter D of 15 mm for all examples (except for the cable corresponding to the curve CAS3, with D=14 mm in FIG. 3). The thickness of the wall of the outer cladding AS (made of PE) is approximately 1.7 mm, and of the layer BN (for instance of expanding fleece) is, approx. 0.6 mm; the chamber body SC (made of PE) has a diameter DS of approx. 10.4 mm (except CAS3, with DS=9.5 mm in FIG. 3); and the core CE of material that is highly resistant to tensile stress which is provided in the interior has an outer diameter of 2.6 mm. The calculations and curve shapes presented here below naturally contain certain errors, for one because of the fact that very precise data material frequently cannot be found in the literature, and that measurements can be conducted only in the scope of specific tolerance values. These imprecisions that are produced by corresponding tolerance values can change the presented, that is to say, calculated or measured, values to a certrain degree, but their significance is far less than that of the improvements which can be achieved by the inventively modified dimensioning of the cable structure. By experimental testing it is possible—for instance, using prototypes—to influence the "synchronization" of the temperature response in order to derive the correct cross-sections or mix ratios, respectively.

In FIG. 3 the curve with the greatest temperature response, as normalized to 20° C., of the expansion dL/L= f(T) of a cable is represented as a dotted line and is referenced CAG2. The appertaining cable has a central element CE with a diameter of 2.6 mm that is highly resistant to tensile stress, and is made of glass fiber reinforced plastic with a matrix material that consists of vinyl ester resin or epoxy resin (20%) and is filled by glass fiber filaments over 80% of its cross-sectional area. The temperature response of this so constructed cable CAG2 ranges from approx. −0.16 at −30° to 0.09 at +60°.

The solid line curve CAS1 differs from the cable structure CAG2 only in that in this case the element CE for high tensile stress consists of a steel wire with a diameter of 2.6 mm. The temperature response of the expansion dL/L of the cable CAS1 is smaller than that of the cable CAG2, but both cables tend to exhibit a basically identical expansion characteristic. The temperature response of this cable CAS1 so constructed ranges from approx. −0.10 at −30 to 0.07 at +60°.

The cable with the broken-curve CAS3 likewise has a core that consist of steel wire 2.6 mm in diameter, although a grooved plastic body SC of small diameter, namely of approx. DS=9.5 mm (instead of 10.4 mm as previously) is presumed, while the wall of the outer cladding AS remains 1.7 mm thick, as in the previous examples. The temperature response of this cable CAS3 thus constructed ranges from −0.1 at −30° to 0.07 at +60°.

The broken, wide or thick line curve RB indicates the expansion characteristic for an optical fiber band (RB4 according to FIG. 2). The wide solid-curve FB indicates the characteristic for an individual coated optical fiber with an outer diameter of 250 μm. Because of the large difference in the temperature characteristic between the curve RB and the curves CAG2, CAS1, CAS3 of the grooved cables in the range below 20°, large chamber depths H must be provided in order to permit the compensating movements at lower temperatures and thus to avoid macrobends.

To demonstrate the degree of influence of the coefficients of expansion of the plastic materials, a multi-component system (i.e. consisting of different materials) is assumed, with a coefficient of expansion of $1 \cdot 10^{-5}$ 1/K for the plastic material (outer cladding AS, plastic body SC of the cable according to FIG. 4 with all other dimensions being identical) is taken as a basis, and calculations are performed for a grooved cable with a GFK core CE (curve CAG5 in FIG. 3), or respectively, with a steel wire core CE (curve CAS4 in FIG. 3). Core and cladding materials are presumed to have the same E module as in the previous examples. In practice, the above cited coefficient of expansion can be realized, or respectively, approximated, in that all PE materials (elements AS and SC in FIG. 4) are filled with LCP, whereby the percentage of LCP depends on the length difference to be corrected.

The broken thick line curve RB and the curve CAS4 follow largely identical courses below 20°; that is, a very small chamber height H can be used, since the expansion of the cable and that of the optical fiber bands proceeds in approximately the same manner ("synchronously").

If, on the other hand, a cable structure according to the curve CAG2 is used, then the strong contraction of this cable at −30° (for instance −0.16%) necessarily leads to appreciable excess length of the bands LB to LBn in the chambers in the structure according to FIG. 4, whose expansion (of CAG2) at −30° amounts to only −0.06% at −30° C., resulting in a length difference of −0.16+0.06=−0.1 for the overall construction. At low temperatures for the cables according to FIG. 4 the optical fiber bands LB to LBn will (theoretically) lay in an approximately wave-shaped line for the purpose of equalizing the length and, in order to be able to accept a greater length, since the kinking forces according to EULER are very small for the band LBn.

Assuming a sinusoidal waveshape is assumed by the bands LB and LBn in the cable according to FIG. 4, the residual gap SP=H−HS (empty space above the band stack at 20° C.) in a cable corresponding to CAG2 must amount to some 0.8 mm if compressive forces are to be prevented from acting on the bands LB to LBn. On the other hand, if one assumes a combination according to the curves RB, on one hand, and CAS4 (FIG. 3), on the other hand, then the gap width SP need only be 0.2 mm in order to be able to accept the remaining length difference consequent to the different expansions (−0.06%+0.055%=−0.005%). A certain residual gap width is generally expedient in order to compensate tolerances in production and potentially for accepting, or respectively, compensating, bending stresses as warranted.

When the grooved cable according to FIG. 4 is fitted not with optical fiber bands but with individual optical fibers (optical fiber with coating=outer diameter of e.g. 250 μm), then an optimally close approximation must be provided between the curve FB, which indicates the temperature response of the coefficient of expansion for an individual optical fiber, and the cable curve. In this regard, the combination with a cable CAG5 is expedient; that is, the optical fibers are arranged in a grooved cable of the above described nature (analogous to CAS4), but with a glass fiber core CE with an outer diameter of 2.6 mm.

In general, the smaller the disparity of the temperature curves is selected in the lower temperature range (that is, the smaller the distance is between the cable temperature curve, on one hand, and the temperature curve for the optical transmission elements (RB,FB), on the other hand), the smaller is the amount of residual gap that must be made available in the chambers CB of the chamber body SC in order to still permit some residual compensating processes at lower temperatures.

In general, the design is advantageously executed such that, first, the curve RB (when optical fiber bands are used) or FB (when individual optical fibers are used) as a function of the temperature for the predetermined temperature range of the cable, for instance from −30° to +60° C., is determined by computation or by experiment. Then the design of the appertaining cable structure is varied, by changing the various parameters (e.g. substituting a GFK core for a steel core CE, replacing the plastic material for the chamber body SC with a different plastic material, replacing the outer cladding AS with a different plastic material), such that in the range between 20° C. and the lower limit value (e.g. −30° C.) the temperature characteristic of the cable structure so obtained lies optimally near the temperature curve of the optical fiber band RB (when optical fiber bands are used), or respectively, the temperature characteristic of the optical fiber FB (when individual optical fibers are used). Besides the above described material variations for the different elements AS, SC and CE, or in addition to these, it is also possible to vary the dimensions of these elements; that is, to make the diameter of the core element CE larger or smaller, to change the wall thickness of the outer cladding AS, and potentially to vary the cross-section of the chamber body as well, for example. By virtue of these manifold design possibilities, it is possible to optimize the appertaining cable structure in the desired scope with respect to the temperature response for the respective optical transmission element; for instance, for a predetermined band temperature response (RB) or a predetermined optical fiber temperature response (FB).

It is expedient that the thermal contraction of the cable in the range from 20° C. to the lowest temperature value according to the respective cable specification (−30° C. in the examples give here) does not deviate more than ±30%, preferably not more than ±20%, from the thermal contraction of the optical transmission element used (e.g. optical fiber FB or optical fiber band RB). A particularly tightly packed construction having a small residual gap can be realized when the thermal contraction of the cable in the range from 20° C. to the lower temperature value deviates less than ±10% from the thermal contraction of the optical transmission element used. In particular, given a favorable selection of material and an exact adapting process, a very compact cable structure can also be realized to the effect that the deviation of the thermal contraction of the cable from that of the optical transmission element is less than ±5%. When all possible parameters are optimally exploited, deviations of even less than ±2% can be realized.

The temperature response of the cable CA, on one hand, and in relation to the temperature response of the optical transmission elements (e.g. the optical fiber LW or the band RB), on the other hand, should be designed such that this deviation is kept optimally small, even at temperatures under 20°. It may also be expedient to relate this deviation into temperatures under 10°, and particularly under 0° C.

As emerges from FIG. 3, the sufficiently close approximation between the cable structure, for instance CAG5, on one hand, and the appertaining optical transmission element, for instance FB, on the other hand, can also be expressed in an absolute quantity. Thus, at the lower temperature limit value of the cable according to the cable specification (−30° in the present example), the deviation between the percentage dL/L value of the temperature response of the optical transmission element (e.g. FB), on one hand, and the percentage dL/L value of an appertaining cable structure (e.g. CAG5), on the other hand, should expediently be selected such that the difference of the appertaining dL/L values is less than ±0.03 percentage points, whereby values under ±0.02 percentage points are used, since very small residual gap widths are then required. When the cable structure is designed very carefully in consideration of the appertaining optical transmission element, it is also possible to realize differences of ±0.01 percentage points in the values dL/L. For example, the cable according to curve CAS4 and the optical fiber bands according to curve RB differ only by less than 0.01 percentage points (=advantageous combination), whereas this cable deviates some 0.035 percentage points relative to individual optical fibers (FB) (=disadvantageous combination).

A small residual gap approximately in the range between 0.1 mm and 0.4 mm in the chambers CB is also expedient in order to allow movement processes in narrow areas, such as can occur when the cable is bent (for instance, during insertion into tubes or the like) or when it is wound onto a cable drum. Here, too, the motion is not completely compensated owing to the friction connection between the optical fiber bands LB to LBn, on one hand, and the wall of the grooved plastic body SC, on the other hand, though the curve of the chambers CB has a helix shape, because the friction of these movement processes are only locally permitted. The coefficient of sliding friction vacillates between 0.2 and 0.7, depending on what materials are paired in the cable design. By reason of the friction coefficients and the small kinking forces according to EULER, the optical fiber band experiences only slight compressive forces through the cable sheath. In general, it is not necessary that the optical fiber bands in the cable structure according to FIG. 4 do not experience any compressions. Very small compressive forces are hardly significant, since these are a matter of instabilities, and the kinking force is small.

The optical fibers, or respectively, optical fiber bands, are generally inserted at room temperature under a usually small bias tension, in such a manner that they rest directly on the floor of the respective chambers CB. Owing to the expansion behavior illustrated in FIG. 3, because at increasing temperatures the cable corresponding to the curves CAG2 to CAG5 expands more intensely than the optical fiber corresponding to the curve FB/RB, the tensile stress is elevated. In a certain respectively known area this is harmless to the respective optical fiber.

Generally, that is regardless of the concrete cable structure, the design is advantageously conceived such that at higher temperatures, that is, in the upper temperature limit range (e.g. 60° C. in accordance with cable specifications), the expansion that is exerted on the optical fibers consequent to the temperature rise does not rise beyond a predetermined limit value, advantageously not over 0.1%, and particularly not over 0.05%. In general, it can be assumed that a temperature-conditioned expansion in the uppermost temperature range (that is, at the highest temperature in accordance with cable specifications—e.g. 60°) of 0.1% (due to a temperature load) has no effect on the life span (due to the then negligible break probability) of the optical transmission elements, and also that the attenuation of the optical fibers is not increased undesirably for the transmission elements. Given temporary effects (for instance during the laying process), particular expansion limit values that generally reach 0.3% or 0.2% are frequently permitted for the optical fibers in accordance with cable specifications (for instance due to tensile stresses). When it can occur during the laying process, the temperature-conditioned expansion should be factored into these limit values; for instance, temperature-conditioned expansion 0.1% + expansion due to tensile forces in the laying process 0.2% results in an overall expansion of 0.3% (in the most unfavorable case).

The closer the curve for the optical fibers/fiber bands FB/RB is to that for the cable (e.g. in the case of the cable structure corresponding to CAG5), the smaller the rise is that the expansion load in the optical fibers/fiber bands experiences. In general, a curve deviation in the upper range, i.e. at the higher temperatures, is less critical, because small tensile stresses in the above cited tolerance range can be accepted by the optical fibers without further ado, without giving rise to an increase of the transmission loss. On the other hand, in most cases the range at lower temperatures is generally more critical, due to the macrobends that may occur, which are not precisely defined, and the macrobend attenuations these cause. It is therefore expedient when the curve characteristics of the cable structure, on one hand, and the optical fibers/optical fiber bands, on the other hand, are more closely approximated to one another in the low temperature range, that is, under 20° C., particularly under 10° C., and preferably under 0° C., as is true of the curves FB on one hand and CAG5 on the other (or RB and CAS4).

The application of the invention is not restricted to the cable structure of what is known as a grooved cable such as is illustrated in FIG. 4. Rather, the invention can generally be used wherever temperature windows are incorporated into the design on account of differing thermal coefficients of expansion. For example, a construction corresponding to FIG. 5 can be provided, where a number of n strand elements CL5 to CL5n have been stranded on a core CE5 that is highly resistant to tensile stress, for instance in the manner of what is known as a loose tube construction. The individual, approximately tubular strand elements have rectangular or round chambers CB5 to CB5n in their interior, in which optical fiber bands LB5 to LB5n are accommodated in the form of a stack in the manner represented in connection with FIG. 4. Here, too, in order to be able to execute expansion processes in the scope of the temperature range that is provided for the cable, a corresponding gap must be provided; that is, the height of the band stack STP5 has to be selected lower then the height of the respective chamber opening. An advantageous allocation between the coefficients of expansion of the optical fiber(s) or of the optical fiber bands, on one hand, and of the cable structure, on the other hand, is selected analogously to the considerations explained in connection with FIG. 3; that is, the band expansion and the overall expansion of the cable structure are so closely approximated to one another that, in the range below 20° C., preferably under 10° C. and particularly under 0° C., the difference of the relative expansion of the cable structure, on one hand, and the optical fibers or fiber bands, on the other, is kept to less than 30%, preferably to less than 20%, and particularly to less than 10%.

FIG. 6 represents an optical cable CA6 which contains an outer cladding AS6 made of plastic material, an intermediate layer ZF6 that is highly resistant to tensile stress, an inner tube SR6 made of plastic, and individual optical fibers LW to LWx that are arranged therein, these being preferably embedded in a soft filling compound FM6.

Assuming a typical (known) cable structure, the depicted cable has the following structure:
Outer diameter of the cable CA6: 11.0 mm
Wall thickness AS6: 2.5 mm, material PE
Wall thickness ZF6: 1.6 mm, material GFK-tube extruded
Wall thickness SR6: 0.55 mm, material PC/PBT or PBT When designed as described above, at −30° the depicted cable has a relative length change dL/L of −0.08%, analogously to FIG. 3. It thus lies a great distance from the curve FB, which applies to individual optical fibers (such as represented in FIG. 6) and has a value dL/L of approx. −0.02% at −30°. At +60° the resulting value of dL/L is +0.05% for a cable according to FIG. 6.

In the scope of the invention there is a first option for "synchronization" to the effect that the optical fibers are thickened from 0.25 mm to 0.35 mm (using an added acrylate coating). Such fibers then have a dL/L of approx. −0.059% at −30° and of +0.017 at +60° C.

If one uses 6 bands instead of the individual optical fibers in FIG. 6, this results in a particular "synchronization", because its dL/L at −30° C. is approx. −0.063%, and at +60° C., approx. 0.01 (cf. FIG. 3).

In order to improve the temperature behavior of a cable analogously to FIG. 6, it is possible in the scope of the invention to modify the actual cable structure, leaving the dimensions unchanged relative to the above exemplifying embodiment:

Instead of 12 individual fibers, 3 pieces of 4-fiber band are used. The outer cladding AS6 consists of 80% PE +20% LCP (Liquid Crystal Polymer—these and the following figures in weight %). The expansion dL/L at −30° is then approx. −0.06% for the cable.

Modified dimensions can also be used. The wall thickness of the outer cladding AS6 can be reduced from 2.5 mm to 1.5 mm (resulting cable diameter=9 mm), which results in a dL/L (−30°) of approx. −0.06%, and a dL/L of 0.038% at +60°.

Figure 7:
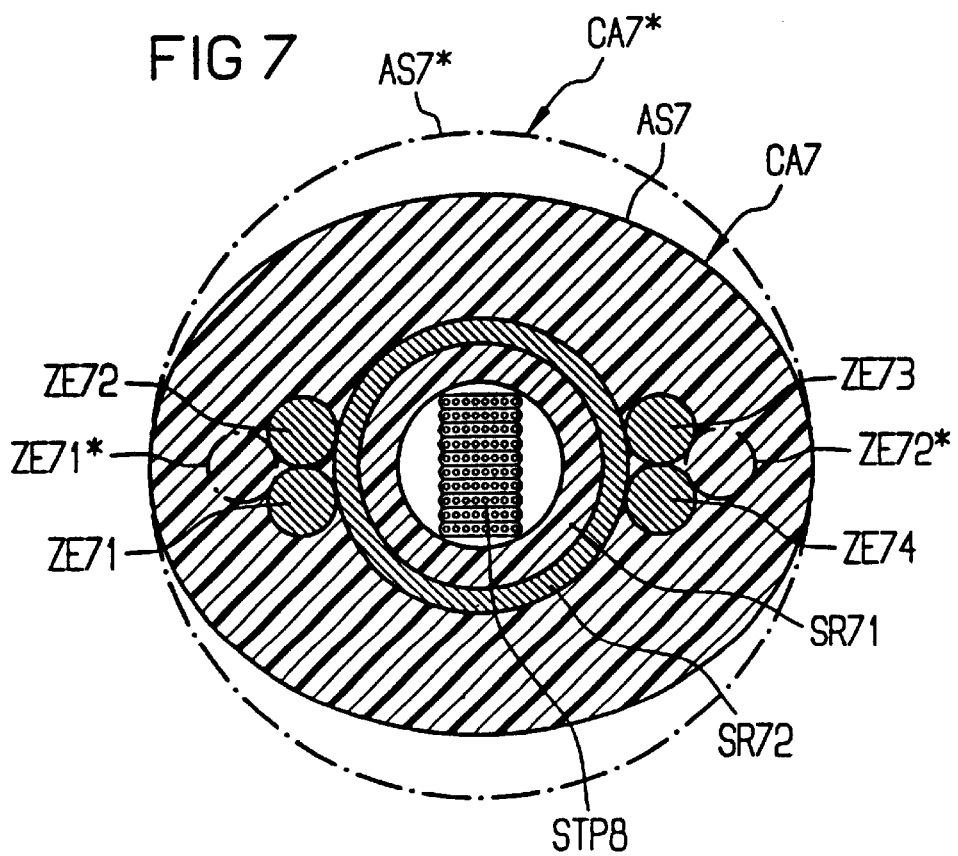
FIG. 7 is a cross section of a cable having individual optical fiber bands that are arranged in a central tube.

FIG. 7 represents in a partly broken fashion a conventional cable CA7* with an outer diameter of approx. 13.9 mm, whose outer cladding AS7* is annular and has a uniform wall thickness of 3 mm and consists of PE. In this outer cladding, two diametrically opposed elements ZE71* and ZE72* (also represented by broken lines) for high tensile stresses are inserted, approximately in the middle, so as to sit in one cross-sectional plane, these comprising an outer diameter of 1.5 mm, and consisting of steel wire. These are followed in the inward direction by a grooved cladding of steel SR72 and a plastic (particularly PBT or PC/PBT) inner tube SR71. In the interior of the tube SR71 a stack STP8 of optical fiber bands is arranged, which stack can be embedded in a filling compound, as warranted. A cable CA7* of this type has a dL/L value of −0.09% at −30°, analogously to FIG. 3, and thus stands at a greater distance from the curve RB that pertains to the optical transmission elements in band form.

In FIG. 7 an optical cable CA7 that is optimized according to the invention and that comprises an oval outer cladding AS7 is represented by a solid line. This is again followed in the inward direction by grooved cladding SR72 of steel and the inner tube SR71 consisting of plastic (particularly PBT or PC/PBT). In the interior of the tube SR71 the stack STP8 of optical fiber bands is again arranged, which may be embedded in the filling compound.

The cable CA7 of the structure that is represented by solid lines in FIG. 7 is optimized in the sense of the teaching of the invention. To this end, a series of changes from the original state CA7* have been implemented:

Instead of PE, an MDPE containing a 10% fraction of LCP is used for the outer cladding AS7. The outer cladding AS7 is shaped like an ellipse having a large axis of 13 mm and a small axis of 11 mm, and the large axis extends where the elements for high tensile stress are arranged. The changes made to the outer contour of the cable CA7 produce a savings in cladding material on the order of magnitude of 30%. Furthermore, the influence of the cladding material on the overall behavior of the cable is reduced owing to the lower proportion of material. LCP has a coefficient of expansion $\alpha$ of $-0.03 \cdot 10^{-4}$ 1/K and an E module of 20,000 N/mm$^2$. The thermal coefficient of expansion of the plastic material is correspondingly reduced by the LCP proportion.

A further change is implemented in that, instead of a respective individual element ZE71*, ZE72* for high tensile stresses on each side, a pair of elements ZE71, ZE72, or respectively, ZE73 and ZE74, are arranged on both sides symmetrically to the large axes of the ellipse. They are also pushed somewhat further to the inside and sit practically directly on the corrugated steel-tube cladding SR72. The diameter of each of these individual elements for high tensile stresses is selected as 1.5 mm here, and the elements consist of GFK. The diameter of the elements for high tensile stress can potentially be enlarged to 1.8 mm, in order to achieve an additional fine synchronization. The inner tube SR71 with an outer diameter of 6 mm and an inner diameter of 4.4 mm (as in CA7) likewise contains an LCP fraction, and in fact on the order of magnitude of approx. 20%, whereas the remaining 80% consists of PBT.

In order to guarantee the longitudinal consistency of the cable both in the embodiment CA7* and in the embodiment CA7, a swellable material can be provided in the area of the elements ZE71* and ZE72* or respectively ZE71 to ZE74 for high tensile stress; for instance, in the form of a swelling thread.

At $-30°$, the cable CA7* with the typical construction has a relative expansion dL/L of approx. $-0.09\%$, analogous to FIG. 3, and thus stands relatively far from that of the curve RB representing the temperature response of the optical fiber bands, which has a dL/L of approx. $-0.06\%$. On the other hand, if the optimization is executed as represented by the cable AS7 according to FIG. 7, the resulting value of dL/L at $-30°$ C. is then $-0.07\%$, which is relatively close to the value of RB of approx. $-0.06\%$. Here, 10 optical fiber bands, which are combined into a stack STP8, are provided with 8 optical fibers each and an outer diameter of 2.1–3.1 mm. However, as FIG. 1 shows, the influence (compared to a 4-fiber band) on the expansion curve is small. The bands of the stack STP8 can be held together in an appropriate fashion, for instance using a reinforcement helix or the like.

FIG. 8 represents an optical cable CA8 which comprises an outer cladding AS8. Two tubular protective sheaths SH82 and SH81 are provided in the interior, SH82 consisting of aramide and/or glass fibers that are highly resistant to tensile stress, which are preferably embedded in a matrix material, and SH81 representing a protective tube that consists of plastic. In the interior of the protective tube SH81, a core element CE8 for high tensile stress is provided, which is thickened to a desired outer diameter by a plastic coating AL8. Several optical fiber leads AD1–ADm are stranded onto this CE8/AL8 element for high tensile stress that has been thickened in this way; in the present example, and additional dummy elements LE–LEm are provided. Of course, it is also possible to strand the entire space with optical fiber leads. The dummy elements LE–LEm expediently consist of plastics that are not very resistant to tensile stress, such as PE, PBT. Each of the optical fiber leads AD–ADm preferably contains one or more optical fibers LW (loose tube), which are preferably embedded in a filling compound.

Assuming that the optical cable CA8 corresponding to FIG. 8 exhibits a conventional structure, then it has an outer diameter of 16.25 mm, and the individual elements exhibit the following structure:

Wall thickness AS8: 2.4 mm, Material: PE

Wall thickness SH82: 0.55 mm, Material: Aramide fibers and glass yarns

Wall thickness SH81: 1 mm, Material: PE

Wall thickness BW8: 0.3 mm, Material: creped sack paper

Outer diameter (surrounding) of the leads AD1–ADm: 7.7 mm

Outer diameter LE–LEm: 2.0 mm, Material PE

Outer diameter AD–ADm: 2.0 mm, Material of Outer Wall: PBT or PC/PBT

Wall thickness AL8: 0.75 mm, Material: PE

Outer diameter CE8: 2.1 mm, Material GFK

The relative expansion dL/L for this cable corresponding to FIG. 3 is $-0.31\%$ at $-30°$ C.

Now, if the above described construction is modified in the sense of the teaching of the invention, first the percentage of strongly contracting plastic is reduced; that is, an outer diameter of only 14.4 mm is provided, and the individual elements exhibit the following structure:

Wall thickness AS8: 2.4 mm, Material: 80% PE and 20% LCP

Wall thickness SH82: 0 mm, i.e. omitted

Wall thickness SH81:1.5 mm, Material: GFK tubing with E = 40,000N/mm$^2$ and $\alpha = 0.6 \cdot 10^{-5}$ 1/K Wall thickness BW8: 0.3 mm, Material: creped sack paper Outer diameter (surrounding) of the leads AD–ADm:7.7 mm Outer diameter LE–LEm: 2.0 mm, Material PE Outer diameter AD–ADm: 2.0 mm, Material of Outer Wall: PBT or PC/PBT Wall thickness AL8: 0.75 mm, Material: PE Outer diameter CE8: 2.1 mm, Material GFK The relative expansion dL/L analogous to FIG. 3 amounts to approx. $-0.044\%$ at $-30°$ C. for this cable and thus lies much closer to the curve FB in FIG. 3. Instead of the LCP fraction or in addition to it, glass fractions can also be added to the PE in the outer cladding AS8, so that a maximum of 70% PE fraction remains; that is, 20% LCP, 10% glass, 70% PE, for example.

To guarantee the "synchronization" with the fiber still better, the individual optical fibers LW can be thickened using acrylate from a diameter of 0.25 mm to a total diameter of 0.3 mm, which results in a dL/L of $-0.038\%$ at $-30°$ C., which is very close to the cable value of $-0.044\%$. Thus, in general it is possible to follow a course of action (in addition to the above described possible solutions or also independently of them) in which the optical fiber(s) is/are thickened by added plastics that are connected to it/them in a mechanically stable manner, for instance, by thick or multiple coating or some other thicker or multiple material deposition (e.g. in optical fiber bands according to FIG. 2), such that at low temperatures an optimally extensive adapting (approximation) of the expansion dL/L to the expansion of the actual cable structure at the lower temperature value is achieved. The material selection and/or the material thickness in the region of the optical transmission elements themselves can also be used to achieve the "synchronization".

Polymers (cladding material and/or lead material) are thus inventively modified with respect to their thermal coefficient of expansion such that the desired dL/L value is achieved at the lower temperature limit value. The type and amount of potential filling compounds are also responsible for determining the degree to which the E module of the starting material is modified; that is, additional properties of the cable can be adjusted via the type and amount of the filling compound (e.g. increase of tension and cross-pressure characteristics with simultaneous reduction of flexibility). Thus, for example, 0–50% filing compounds can be provided, consisting of glass and/or carbon and/or mineral particles, which can be arranged in the form of fibers, balls, or irregular formations, either alone or in combination. The following are examples of materials before and after the insertion of filling compounds:

AW=1→cladding components
AW=2→lead components
AW=3→filling compound
POM=Polyoxymethylene acetal
PA=Polyamide
PC=Polycarbonate
PBT=Polybutene terephthalate The α values (given here at 23° C.—in the first approximation this value can be used as linear coefficient of thermal expansion for the range between room temperature and +80° C.) however [ . . . ]; at lower temperatures, smaller values should be expected.

30% from the thermal contraction dL/L of the optical transmission element.

2. A fiber-optic cable according to claim 1, wherein the dimensions and materials of the cable are selected so that at an upper temperature range above 20° C., a temperature-conditioned tensile stress is exerted on the optical transmission element by virtue of the expansion of the cable structure.

3. A fiber-optic cable according to claim 2, wherein the materials are selected so that the tensile force does not create an impermissible expansion of the optical transmission element at the uppermost temperature value.

4. A fiber-optic cable according to claim 3, wherein the expansion of the optical transmission element is not more than 0.1% for an upper temperature limit of 60° C.

5. A fiber-optic cable according to claim 1, wherein the optical transmission element is formed by combining several optical fibers into a fiber band.

6. A fiber-optic cable according to claim 5, wherein the chamber has more than one fiber band.

7. A fiber-optic cable according to claim 1, wherein the materials and the dimensions of the cable and the optical transmission elements at a temperature in a range between 20° C. and −30° C. provide a difference of the thermal contraction of the optical transmission elements and of the cable structure of a value of under ±0.03%.

8. A fiber-optic cable according to claim 7, wherein the difference of the expansion values is under ±0.02%.

9. A fiber-optic cable according to claim 7, wherein the difference of the expansion values is under ±0.01 percentage points.

10. A fiber-optic cable according to claim 1, wherein the dimensions for the chamber are selected so that the local bending radius that results from an additional excess length of the optical transmission element at the lowest temperature limit value is greater than 70 mm.

| AW | Polymer Aramide | Filling Compound | Percentage of filling compound (by weight) | α (polymer) · $10^{-5}$ 1/K | α (filled polymer) · $10^{-5}$ 1/K | E module (filled polymer) N/mm$^2$ | E module of polymer only |
|---|---|---|---|---|---|---|---|
| 1.2 | PA6 | Glass fiber | 50 | 10 | 1..1.5 | 10000 | 3000 |
| 2 | PC/PBT | Glass fiber | 30 | 9 | 3 | 7100 | 2000 |
| 2 | POM | Glass fiber | 40 | 11 | 1 | 14000 | 3000 |
| 2 | POM | Glass balls | 10 | 11 | 1.1 | 3100 | 3000 |
| 2 | PAI | Carbon fiber | 30 | 3 | 0.9 | 22300 | 4900 |
| 3 | LCP | Glass fiber | 30 | −0.3 | −0.1 | 16000 | 10400 |

What is claimed is:

1. A fiber-optic cable comprising at least one chamber for receiving at least one optical transmission element, said chamber having a dimension slightly larger than the dimensions of the optical transmission element received therein, said cable having at least one element for high tensile stress and one cable cladding, said dimensions and materials of the cable being selected so that a thermal contraction dL/L of the cable in a range of temperatures from 20° C. to a lower temperature limit of −30° C. does not differ by more than 11. A fiber-optic cable according to claim 1, wherein the cable has several helix-shaped chambers and the optical transmission elements are inserted in these chambers.

12. A fiber-optic cable according to claim 1, wherein the cable includes several individual tubular stranding elements, each of said stranding elements having the chamber for receiving an optical transmission element.

13. A fiber-optic cable according to claim 1, wherein the cable has a tubular element in the center forming said chamber for receiving the optical transmission element.

14. A fiber-optic cable according to claim 1, wherein the optical transmission element is formed by an individual optical fiber.

15. A fiber-optic cable according to claim 1, wherein the selection of the materials and the dimensions to obtain the desired thermal contraction dL/L of the cable and the optical transmission element is by selection of the materials of the cable and the wall thicknesses of the elements of the cable.

16. A fiber-optic cable according to claim 1, wherein the cable structure consists of a plastic having additions selected from the group consisting of PMMA, LCP and glass fractions.

17. A fiber-optic cable according to claim 1, which includes each of the optical fibers of the optical transmission elements being thickened using a coating of plastic selected to change the thermal contraction dL/L in relation to the cable structure, so that only a slight adjustment of a maximum of 0.05% occurs therebetween.

* * * * *